United States Patent [19]

McCullough

[11] Patent Number: 4,836,237
[45] Date of Patent: Jun. 6, 1989

[54] COMBINATION SILLCOCK AND LEAKAGE RELIEF SYSTEM

[76] Inventor: Frederick L. McCullough, 209 N. Division, Cleveland, Okla. 74020

[21] Appl. No.: 251,328

[22] Filed: Sep. 30, 1988

[51] Int. Cl.⁴ .................................................. F16L 5/00
[52] U.S. Cl. ..................................... 137/312; 137/360
[58] Field of Search .............. 52/192, 220; 137/360 X

[56] References Cited

U.S. PATENT DOCUMENTS

| | | | |
|---|---|---|---|
| 2,952,270 | 9/1960 | Fulton et al. | 137/360 X |
| 4,158,366 | 6/1979 | Van Meter | 137/360 X |
| 4,178,956 | 12/1979 | Fillman | 137/360 |
| 4,314,580 | 2/1982 | Steinwand | 137/312 X |
| 4,475,570 | 10/1984 | Pike et al. | 137/360 X |

Primary Examiner—David A. Scherbel
Assistant Examiner—Creighton Smith
Attorney, Agent, or Firm—Head & Johnson

[57] ABSTRACT

An apparatus for providing a frostproof sillcock for a structured wall having a spigot at one end and a pipe connection at the other, including a tubular member slid over the sillcock providing an annular area between the exterior of the sillcock and the interior of the tubular member. Elastomeric gaskets seal both ends of the tubular member. A small diameter opening in the tubular member adjacent the spigot receives a short length of small diameter flexible tubing so that one end of the tubing communicates with the annular area and the other end extends below the spigot and exteriorly of the building wall. Any leakage of the sillcock is thereby drained away.

2 Claims, 1 Drawing Sheet

COMBINATION SILLCOCK AND LEAKAGE RELIEF SYSTEM

SUMMARY OF THE INVENTION

Substantially all buildings are provided with spigots by which water pressure is available exteriorly of the building. The common means of providing a source of water pressure exterior of a building is by means of a sillcock which extends through the building wall, usually a foot or two above ground level. In many residences wherein a raised floor is employed, the sillcock extends through the wall to a crawl space below the floor. In other buildings wherein a basement or below ground floor is provided, the sillcock typically extends through the exterior wall with a piping connection within an interior portion of the wall. Sillcocks typically include a spigot having a handle and means for connecting a hose or other item to the spigot, such as for watering lawns or shrubbery, washing windows, washing cars, or so forth.

Since sillcocks are so frequently employed, they are a conventional plumbing item and the typical sillcock, which is sometimes referred to as a "freeze proof" sillcock, is formed of a long tubular member having a spigot with a handle and a hose connection at the first end and having a threaded piping connection at the second end. A valve is provided within the long tubular member adjacent the second end with a rod extending through the spigot and connected to the handle. Water remaining in the sillcock after the valve is turned OFF is supposed to be drained through the spigot and out the hose connection. In this way, the sillcock is supposed to be freeze proof, and if properly operated, functions in a freeze-proof manner assuming that the interior of the building where the piping connection is made always remains above freezing temperature.

In practical operation, however, sometimes events occur which cause the sillcock to freeze. This can occur if a hose or other apparatus is left attached to the spigot so that even if the spigot is closed the tubular portion of the sillcock does not drain. If this happens during subfreezing temperatures, the tubular portion of the sillcock can freeze and the expansion caused by the freezing within the tubular portion can cause it to split open. When this occurs, such damage is not visibly ascertainable since it occurs within the wall of the building. The user may be unaware of a leaking sillcock. When the user then turns ON a defective sillcock, water can leak from the damaged tubular portion into the wall of the building and can cause substantial damage before the defect has been detected.

The present invention provides a means for preventing damage to the wall of a building in the event of the inadvertent leakage of a sillcock. The invention includes the use of a tubular member of an internal diameter greater than the external diameter of the sillcock tubular portion and greater in internal diameter than the threaded connection at the second end of the sillcock. The tubular member is slipped over the sillcock plumbing connection and over the tubular portion providing an annular area between the exterior of the sillcock tubular portion and the interior of the tubular member.

A first washer of an elastomeric material is positioned over the sillcock tubular portion and adjacent the spigot end. The washer has an external diameter to engage the internal wall of the tubular member. In like manner, a second elastomeric washer is positioned over the sillcock plumbing connection and onto the tubular portion to engage the interior of the tubular member adjacent the second end. The washer thereby supports the tubular member concentrically about the sillcock tubular portion and provides an annular area which is sealed at both ends.

A small diameter opening is formed in the tubular member adjacent the first end. A small diameter drain tube is positioned within the opening. The drain tube first end communicates with the annular area within the tubular member. The drain tube second end extends below the spigot and exterior of the building. Adhesive material is applied to retain the drain tube within the opening so that the first end remains within the annular area.

If the sillcock tubular portion develops a leak such as a result of freezing, manufacturing defect or for other reasons, the water leaking from the sillcock enters the annular area within the tubular member. The water is trapped within the annular areas by the elastomeric seals at each end and is drained exterior of the building through the drain tube. This accomplishes two purposes. First, damage to the building wall is prevented. Second, the drainage provides an indication to the building owner that a damaged sillcock exists so that it can be replaced.

A better understanding of the invention will be had to the following description and claims, taken in conjunction with the attached drawings.

DESCRIPTION OF THE DRAWINGS

FIG. 2 demonstrates the use of the apparatus in conjunction with the sillcock to reduce the possibility of damage to a building wall if a leak develops in the sillcock.

DESCRIPTION OF THE PREFERRED EMBODIMENT

Figure 2:
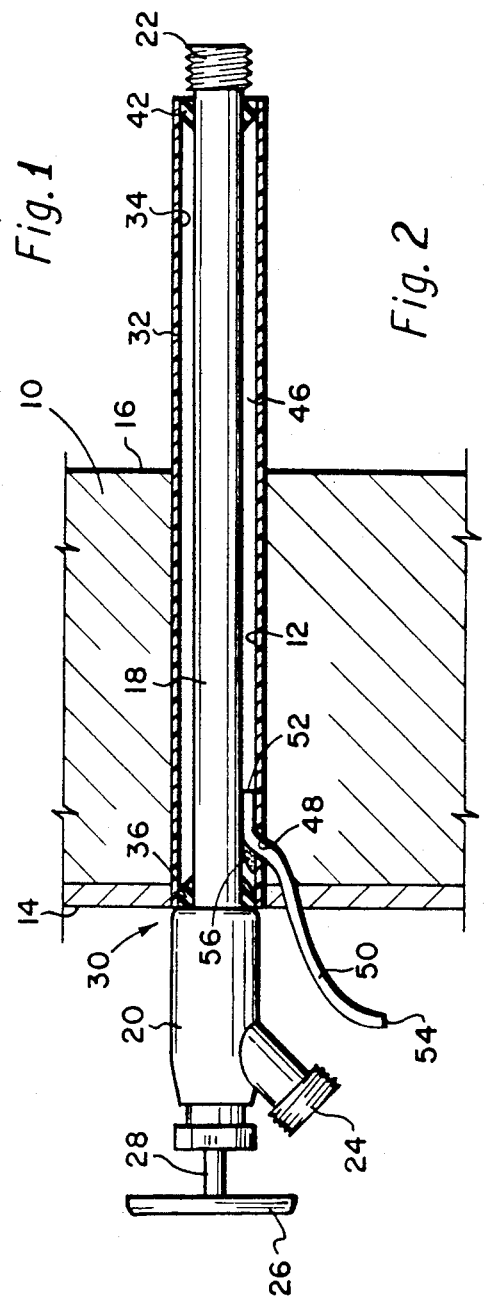
FIG. 2 is an elevational cross-sectional view of a portion of a building wall having a frost-proof sillcock installed therein and employing the apparatus of this invention as shown in FIG. 1, but in reduced scale.

Referring to the drawings and first to FIG. 2, a cross-sectional portion of the exterior wall of a building 10 is shown. The wall has an opening 12 therethrough. The wall has an exterior surface 14 which is exposed to ambient temperature and in many parts of the world is occasionally exposed to subfreezing temperatures. The wall interior 18 is in a heated area or in an area insulated from ambient temperature so as to typically remain at all times above freezing. Thus, plumbing retained interiorly of the inner wall 16 is typically not subject to freezing whereas plumbing exterior of the wall 16 is subject to freezing. In addition, when the ambient temperature exterior surface 14 is exposed to below freezing, such below freezing temperature will extend particularly towards the interior wall 16 within opening 12.

To provide a source of water pressure exteriorly of the building having wall 10, a frequent expedient is the use of a freeze-proof sillcock as illustrated in FIG. 2. The sillcock includes an elongated tubular portion 18 having on the forward end thereof a spigot 20. On the rearward end of tubular portion 18 is a plumbing connection 22 exemplified by the externally threaded fitting illustrated, but which could also be an internally threaded fitting. The spigot 20 includes an integral hose connector portion 24 and a handle 26 by which the flow of water is turned ON and OFF. Adjacent the second end or plumbing connection 22 and interiorly of the tubular portion 18 is a valve which is not shown since such is a common expedient. The valve is controlled by rod 28 extending from handle 26.

In the typical operation of the sillcock thus described, the sillcock being indicated generally by the numeral 30 and being made up of components 18-28, is retained within opening 12 and functions as a freeze-proof method of providing a source of water pressure at the building wall exterior surface 14. The sillcock is termed to be "freeze proof" since when it is closed, the interior of the tubular portion 18 is drained through the hose connection 24. Thus, even in freezing weather, if the sillcock is used to provide a source of water pressure at the hose connection portion 24, after the water pressure is turned OFF, the sillcock is self draining. This system works satisfactorily except that if for any reason the hose connection portion 24 is blocked, such as by a hose or other apparatus left attached which does not permit the tubular portion 18 to be fully drained, the occurrence of subfreezing temperatures can cause the tubular portion 28 to be subjected to freezing. When this occurs, the formation of ice within the tubular portion can rupture the tubular portion 18. Thereafter, when the sillcock 30 is utilized, water can leak out of the ruptured tubular portion 18 and penetrate wall 10. Such leakage may not be detected for a long period of time resulting in substantial building damage since the leakage may not occur in such a way that the water passes out the opening 12 to the wall exterior surface 14. In addition to being ruptured by freezing, the tubular portion 18 may develop a leak as a consequence of manufacturing defects, or twisting of the spigot 22 by vigorous closing of valve 26. If spigot 22 is struck by an object, such as a lawn mower or the like, the tubular portion 18 may be bent causing it to leak. In any event, if a leak occurs in the sillcock tubular portion 18 the consequences can be very damaging and may go on undetected for a substantial length of time.

Figure 1:
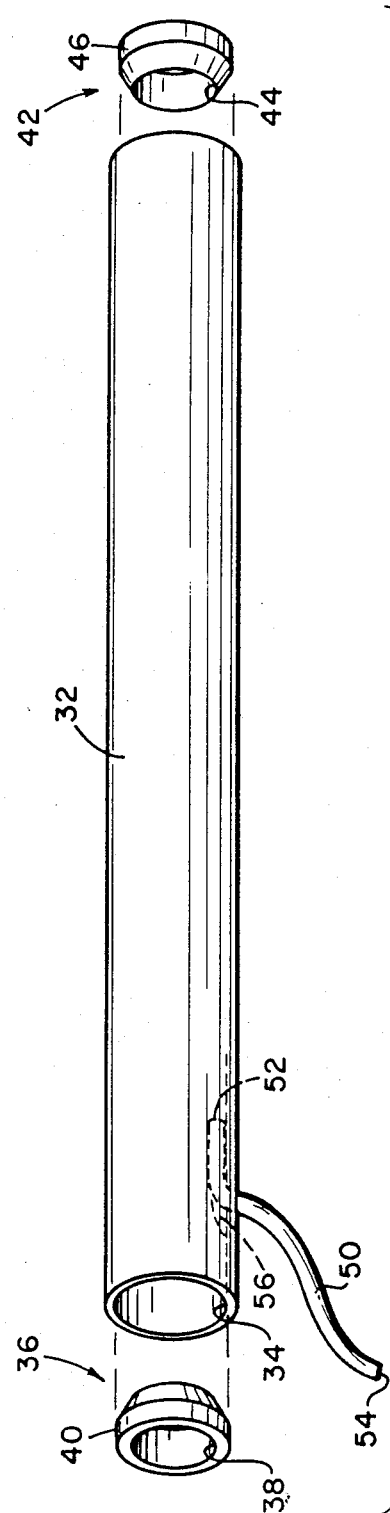
FIG. 1 is an exploded view of an apparatus for use with a frost-proof sillcock exemplifying a means of practicing the invention.

The present invention combats the consequences of leakage in the sillcock tubular portion 18. For this purpose, the apparatus of FIG. 1 is employed which includes a tubular member 32. Tubular member 32 is of a length substantially equal to the length of the sillcock tubular portion 18 and may be formed of plastic, fiber glass or metal. The tubular portion 32 has an internal wall 34 the diameter of which is greater than the exterior diameter of the sillcock tubular portion 18, and, in addition, is greater in diameter than the plumbing connection portion 22 so that the tubular member 32 may be telescopically positioned over the rearward end of sillcock 30.

Also received on the sillcock tubular portion 18 is a first seal member 36 which is preferably formed of elastomeric material such as natural or synthetic rubber or pliable plastic. The seal member 36 has an interior opening 38 of a diameter to be slideably received upon the sillcock tubular portion 18 and has sufficient elasticity so that is can be stretched over the plumbing connection 22. In the installation of the device of this invention the first seal member 36 is first positioned on the sillcock portion 18 contiguous with the spigot 20 before the tubular member 32 is positioned onto the sillcock.

The first seal member 34 has an exterior diameter 40 which snugly receives the tubular member interior wall 34.

A second seal member 42 which is preferably identical to the first seal member 36 has an opening 44 slideably received upon the sillcock member 38, and like seal member 36 is expandable so as to be positionable over the plumbing connection 22. Further, the second seal member 42 has an external cylindrical surface 46 which snugly receives the interior wall 34 of tubular member 32.

When the tubular member 32 is positioned on the sillcock 30 with the first and second seal members 36 and 42 in position as shown, a closed annular area 46 (See FIG. 2) is formed about the exterior of the sillcock tubular portion 18.

The tubular member 32 has a small diameter opening 48 which receives a small diameter drain tube 50, preferably formed of flexible plastic. The first end 52 of drain tube 50 is received within the interior of tubular member 32 and within the annular space 46. The second end 54 of the drain tube 50 extends externally of tubular member 32 and below the spigot 20 and exteriorly of the building wall exterior surface 14. To retain the drain tube within opening 48 and prevent is inadvertent removable, adhesive 56 is applied to the drain tube within the interior of tubular member 32. The drain tube 50 is secured to the tubular member 32 before the tubular member is inserted onto sillcock 30.

With the apparatus in place as illustrated in FIG. 2, any leakage of water from the sillcock tubular member 18 is captured within the annular space 46. This water drains through the drain tube 50 and is discharged exteriorly of the building. This accomplishes two purposes. First, it prevents damage to the building wall 10. Second, drainage of water from the drain tube 50 provides an indication to the building owner that the sillcock is leaking and requires replacement.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for use with a building wall subject to freezing ambient temperature to provide a source of water pressure exterior of the building wall from a piping source within the interior of the wall, and having improved means of preventing damage to the structure in the event of rupture, comprising:

a generally horizontally extending sillcock having a tubular portion with a spigot at the first end and a plumbing connection means at the second end for connection to a source of water pressure, the sillcock having a length to extend through a wall of a structure whereby the spigot is positionable exterior of the wall and the plumbing connection means is interior of the wall, the spigot having a handle means for turning water ON and OFF;

a tubular member having a first and second end and in which the internal diameter is greater than the external diameter of said sillcock tubular portion and of length substantially that between said sillcock spigot and said plumbing connection means, the tubular member having a small diameter opening therein adjacent said first end and the tubular member being received on said sillcock and providing an annular area between the interior of the tubular member and the exterior of said sillcock tubular portion;

a first elastomeric member having an opening therethrough received on said sillcock tubular portion adjacent said first end thereof and sealably engaging said tubular member adjacent said first end thereof;

a second elastomeric member having an opening therethrough received on said sillcock tubular portion adjacent said second end thereof and sealably engaging said tubular member adjacent said second end thereof;

a flexible flow tube of reduced diameter compared to said sillcock tubular portion, the flow tube having a first and second end, the flow tube being received in said tubular member small diameter opening with said first end received in said annular area between the exterior of said sillcock tubular portion and the interior of said tubular member, the flow tube second end being exterior of said tubular member and below said spigot whereby any leakage of water from said sillcock tubular portion will be captured within said tubular member and drained exteriorly of a building wall through said drain tube; and adhesive means within said tubular member and exterior of said drain tube to retain the drain tube within said tubular member small diameter opening.

2. An apparatus for use with a building wall subject to freezing ambient temperature to provide a source of water pressure exterior of the building wall from a piping source within the interior of the wall, and having improved means of preventing damage to the structure in the event of ruptures, comprising:

a generally horizontally extending sillcock having a spigot at the first end and a plumbing connection means at the second end for connection to a source of water pressure, the sillcock having a length to extend through a wall of a structure whereby the spigot is positionable exterior of the wall and the plumbing connection means is interior of the wall, the spigot having a handle means for turning water ON and OFF, the sillcock having an elongated tubular portion connected to said spigot at the first end thereof and to said plumbing connection means at the second end thereof, the spigot and the plumbing connection means having portions of diameter larger than said tubular portion;

a tubular member having a first and second end and in which the internal diameter is greater than the external diameter of said sillcock tubular portion and of length substantially between said sillcock spigot and said plumbing connection means, the tubular member having a small diameter opening adjacent said first end thereof;

a first washer of elastomeric material having an opening therethrough dimensioned to be slideably but snugly received on said sillcock tubular portion, and an outside diameter dimensioned to engage said tubular member internal diameter, the first washer being received upon said sillcock tubular portion and in engagement with said spigot and with the interior of said tubular member at the first end thereof;

a second washer of elastomeric material having an opening therethrough dimensioned to be slideably but snugly received on said sillcock tubular portion, and of an outside diameter dimensioned to engage the interior of said tubular member, the second washer being received upon said sillcock tubular portion and supported concentrically thereon by said first and second washers and providing an annular area between the interior of said tubular member and the exterior of said sillcock tubular portion;

a flexible flow tube of reduced diameter compared to said sillcock tubular portion, the flow tube having a first and second end, the flow tube being received in said tubular member small diameter opening with said first end received in said annular are between the exterior of said sillcock tubular portion and the interior of said tubular member adjacent said spigot and the second end being exterior of said tubular member and below said spigot whereby any leakage of water from said sillcock tubular portion will be captured within said tubular member and drained exterior of a building wall through said drain tube; and adhesive means within said tubular member and exterior of said drain tube to retain the drain tube within said tubular member small diameter opening.

* * * * *